United States Patent [19]
Franzen et al.

[11] 3,813,544
[45] May 28, 1974

[54] METHOD FOR EVAPORATING, DESTROYING, EXCITING AND/OR IONIZING SPECIMEN MATERIAL LIMITED TO MICRO-REGIONS, AND ARRANGEMENT FOR CARRYING OUT THIS METHOD

[75] Inventors: G. Franzen, Munich; Franz Hillenkamp, Freising; Raimund Kaufman, Freiburg; Ernst Remy, Munich, all of Germany

[73] Assignee: Ernst Remy, Munich, Germany

[22] Filed: Aug. 16, 1972

[21] Appl. No.: 281,231

[30] Foreign Application Priority Data
Aug. 18, 1971  Germany............................ 2141387

[52] U.S. Cl.................. 250/281, 250/282, 250/492
[51] Int. Cl............................................. H01j 39/34
[58] Field of Search.... 250/41.9 SE, 41.9 R, 49.5 B, 250/338, 340, 341, 281, 282, 492; 331/94.5

[56] References Cited
UNITED STATES PATENTS
3,171,955   3/1965   Cardile........................... 250/49.5 B
3,229,095   1/1966   Lasher et al......................... 250/84
3,294,970   12/1966  Jenckel........................ 250/41.9 SE
3,505,521   4/1970   Wegmann et al............. 250/49.5 B
3,527,536   9/1970   Alpen................................. 356/72
3,574,467   4/1971   Paine................................ 331/94.5

OTHER PUBLICATIONS
"Laser Micro–Spectral Anal." Moenke et al. Jena Review, Nov. 3, 1966, p. 166 to 171, 356–386.

Primary Examiner—James W. Lawrence
Assistant Examiner—B. C. Anderson
Attorney, Agent, or Firm—Bierman & Bierman

[57] ABSTRACT

Method and apparatus for examining micro-regions of biologic specimens normally radiation absorptive in which a source of coherent electromagnetic radiation is optically focused on a selected region of the specimen. The power density is adjusted in the central diffraction disk to the point where the specimen becomes absorbent, the power density distribution in the first diffraction ring being below the level necessary to initiate absorption in the said first diffraction ring. In its preferred form, the coherent radiation is fed to a microscope having a cooled objective through which focusing on a selected micro-region is achieved.

26 Claims, 2 Drawing Figures

PATENTED MAY 28 1974  3,813,544

⊢ 1 μm

METHOD FOR EVAPORATING, DESTROYING, EXCITING AND/OR IONIZING SPECIMEN MATERIAL LIMITED TO MICRO-REGIONS, AND ARRANGEMENT FOR CARRYING OUT THIS METHOD

The invention concerns a method for evaporating, destroying, exciting and/or ionizing specimen material, limited to micro-regions, by means of coherent electromagnetic radiation which is focused by an optic system on the specimen.

Such a method can be used either for the production of certain desired changes and destructions in the specimen itself or for the production of an emission of atoms and molecules of the specimen material in the charged or uncharged state, which can then be further analyzed with additional detection methods, like mass spectroscopy, for example. Arrangements for carrying out such a method and principal considerations on its apllicability are known from German Pat. No. 1,598,632. Relatively unproblematic is the use of such a method when the specimen material is highly absorbent and there are no special requirements regarding the region to be analyzed.

The invention, however, is based on the problem of applying a method of the above-mentioned type to biological specimen material and to carry out investigations in the subcellular region. A "radiation puncture method" is thus to be provided with which matter can be removed from minute, well-defined regions of biological micro-structures, for example, cells or cell parts, and where either the changes or destructions caused by it and their influence on the respective micro-organism are the subject of the investigation (for example "gene surgery" and similar applications) or where the composition of the emitted material is measured to obtain data about the distribution of certain substances inside the cells. Examples for such investigations are, for example, the general research in the vital and metabolic processes and transport mechanisms inside the cell and their control by enzymes, which are linked to substructures of the cells, like membranes, mitochondira, lysosomes and myofillaments. Of particular interest is the subcellular distribution of the activating or inhibiting ions which are important for the enzymatic activity (e.g. $Na+$, $K+$, $Mg+$) and their position changes. Ion-distributions within the cell also play a considerable part in the research of diseases of the myocardium, kidney diseases, in cancer research etc. Finally general findings on the effectiveness of known or new drugs can be obtained by investigating the distribution of the respective active substance within the cell.

The application of the above mentioned method to this field encounters considerable difficulties. Successful attempts to adapt the method correspondingly and to overcome these difficulties are not known so far. A main difficulty is encountered when the absorption power of biological specimen material is too low to be excited by lasser beams, particularly in the case of thin-layer preparations to be observed under the microscope, with cell material containing cell fluid. A second problem is the demand for extremely small dimensions of the region actually determined by the laser beam and excited to emit or evaporate material. For the investigation of subcellular structures the dimensions of this region should be in all directions not more than 1 and $2\mu$, but preferably less than $1\mu$ up to a few tenths of of $1\mu$. By focusing the laser beam on such small regions, we arrive, on the one hand, at the limit of the resolution power of the optical system given by diffraction and wavelength, on the other hand however, the volume of such a small region would be by at least 2 orders of magnitude smaller than the volumes determined in present tests for lasser evaporation of specimen material, and the number of emitted and detectable ions decreases correspondingly.

The method according to the invention is based on the finding that, when the power density is increased in the focus of a laser beam, the absorption increases abruptly in a relatively small interval in weakly absorbent specimen material, like biological material, the location and width of this interval depending on the respective material and on the wavelength used. While practically missing absorption and hardly any emission of atoms or ions are observed below this limit, a very strong absorption is observed above this limit with practically complete destruction of the material.

According to the invention, a method of the above described type is characterized in that the power density of the radiation is so adjusted, in order to influence biological specimen material and to achieve an extension of the excited region of the specimen which is under the size of a cell, that it is in the focus in the diffraction maximum of the zero-th order above and in the diffraction maximum of the first order below the limit at which the abrupt increase of the absorption sets in in the specimen material.

This has the advantage that we obtain, on the one hand, in the focus in the central diffraction disk a very strong absorption, and a correspondingly strong emission of uncharged and charged particles of the specimen material, and that, on the other hand, this strong absorption is limited to the central diffraction disk, while in the diffraction maximum of the first order and in all other diffraction rings practically no absorption of the radiation appears anymore and the specimen material thus remains unaffected. This way it is possible to considerably reduce the dimensions of the area from which material issues from the specimen, namely below the limit which results theoretically for the size of the focus according to the laws of diffraction optics. Only this way is the application of the method possible for the investigation of biological specimen material in the subcellular region. A prerequisite is that the abrupt increase of the absorption must be so pronounced that it is possible to make the material issue only in the zero-th, but not in the first diffraction maximum. With careful adjustment and constancy of the power density it may even be possible to limit the strong absorption to a small region in the center or maximum of the central diffraction disk, so that the resolution can be further increased.

It was found, however, that there is a risk, when working in the above mentioned range of the power density, that the excitation and heating of the specimen material, concentrated on the central diffraction disks, will spread automatically in the sample material by secondary processes, presumably by shock waves, and lead to an abrupt increase of the region determined by the evaporation and erosion. This risk can be eliminated by a suitable selection of the wavelength and/or the impulse width of the laser beams used.

Preferably the power density in the focus in the diffraction maximum of the zero-th order should be above, in the diffraction maximum of the first order below a limit which is for a common biological specimen material and for normal laser wavelengths at about $10^7$ to $10^9$ W/cm$^2$, and which can be determined by simple tests for the respective specimen material and the wavelength used.

In order to increase, on the one hand, the absorption of the radiation used and thus to be able to work with low powder densities, and to obtain, on the other hand, a focus with smaller dimensions according to the diffraction laws, it is advisable to use a laser emitting in the UV-region or a laser whose radiation is transposed by frequency doubling or by non-linear effects in the UV-wavelengths region.

Working in the above mentioned range of the power density is of particular advantage in view of the achievement of smaller excited regions. But this may have the disadvantage that the energy spectrum of the charged particles leaving the excited regions, presumably by various processes, like evaporation, collision, ionization, field emission, is extremely wide. It ranges from 0 to over 1,000, in multiple-charged ions even over 2,000 eV. There is hardly a mass spectrommeter known which can record and process ions with such a wide energy spectrum. A preselection according to energy would therefore be necessary, which would result in a great loss of detection probability. In order to eliminate this difficulty, at least partly, it is provided according to a preferred embodiment of the invention that an electric and/or magnetic field is applied to the specimen material in order to brake the issuing ions and to concentrate their energy. To this end can be used, for example, an electromagnetic high-frequency field. It is of particular advantage if the specimen is arranged directly in the magnetic field of a series-connected mass spectrometer. This magnetic field can be used particularly to influence the electrons issuing at the start of the evaporation process from the specimen material in their movement in such a way that their after-accelerating effect on the following ions is eliminated. Furthermore these fields can be used to ionize any existing inert gas portions or to guide the charged particles into the mass spectrometer. It is also possible to influence the energy distribution of the emitting ions favorably by optimum selection of impulse width and wavelength.

The invention also concerns an arrangement for carrying out the above method with a laser, an optical system focusing the laser beam, a specimen arranged in the focus, and a mass spectrometer absorbing the emitted specimen material. Such an arrangement is characterized according to the invention in that the specimen is arranged in the magnetic field of the mass spectrometer or in a magnetic and/or high-frequency field arranged ahead of the latter.

Preferably the objective of a microscope used for the visual observation of the specimen serves at the same time as a focusing optic system for the laser beam introduced laterally into the microscope.

According to the invention, biological specimens with cells still containing the cell fluid are preferably examined. Microscopic thin-layer specimens of such a material can only be produced in the deep frozen state, and for this reason the arrangement is preferably equipped with a deep freezing device. For biological specimens to be tested it is therefore necessary to continue to cool them effectively and particularly evenly in all ranges after extremely rapid deep freezing, which is effected outside the apparatus, and after they have been placed in the apparatus. It is therefore not sufficient as a rule to cool merely the specimen holders, but a very effective and direct cooling of the specimens is necessary. To this end it is suggested according to the invention to fill the space between the specimen or a window covering the specimen and an objective focusing the laser beam with a preferably circulating cooling liquid which acts as an immersion medium due to their optic properties. Suitable cooling liquids, which have a sufficiently low vapor pressure, remain liquid even at very low temperatues, and which are pervious to UV-light, are fluorinated hydrocarbons, partcularly frigen 23. Due to this use of a coolant as an immersion liquid, the specimen and the objective are cooled so effectively that the formation of temperature gradients between specimen, specimen holder and objective is prevented.

In another arrangement, the objective cooled by a cooling liquid can be arranged together with the specimen in a vacuum chamber. In this case too, the heat conducting from the objective is eliminated.

The arrangement according to the invention is preferably equipped wtih auxiliary devices for additional measurement, for example, for measuring UV-low temperature luminescence as well as with spectrophotometric devices for measuring absorption, fluorescence, scatter and/or phase rotation of visible and invisible light.

In order to be able to focuse the extremely small effective focal spot of the laser beam exactly on a desired point of the specimen, e.g. a certain cell structure, it is of advantage to provide a device that permits to focus on the respective region of the specimen exactly into the focal spot of the laser beam prior to the release of a laser impulse. Because of the extremely low depth of focus, the focusing must be effected not only in the x- and y-coordinates of the specimen plane, but also in the Z-direction perpendicularly thereto. In an advantageous further development of the invention, a continuously burning light source for visible light is therefore arranged in front of the optic system focusing the laser beam in such a way that it produces a focal spot serving as target marks, which coincides with the focal spot of the laser beam in location and focal plane. The light source can be particularly a continuously operated laser with low power density, whose path of rays can so coincide with the principle or power laser that it can also be used for the preadjustment of the principal laser.

In deep frozen specimens the cells and their substructures are stationary so that there is sufficient time for focusing with the auxiliary focal spot and the subsequent manual release of the laser impulse. In some cases, particularly when the beam puncture is used in living cell organisms, we have to work with super-cooled specimens where the cells or microorganisms to be determined move freely in the surrounding liquid and perform extremely rapid locomotions, partly on the basis of Braun's molecular movement and partly by their own motion organs. The time in which such a biological microstructure passes through the target spot, then is mostly shorter than the human reaction time necessary to release the laser impulse. In order to effect an automatic release of the laser impulse, the different light scatter on the microstructures to be observed and on the surrounding liquid is utilized according to the invention. To this end one or several photo-receivers for the light of the auxiliary light source scatter as on the specimen and a release mechanism for the laser impulses, controlled by the photo-receiver, are arranged in front of and/or behind the specimen.

The invention will be described more fully below on the basis of the attached drawings.

Figure 1:
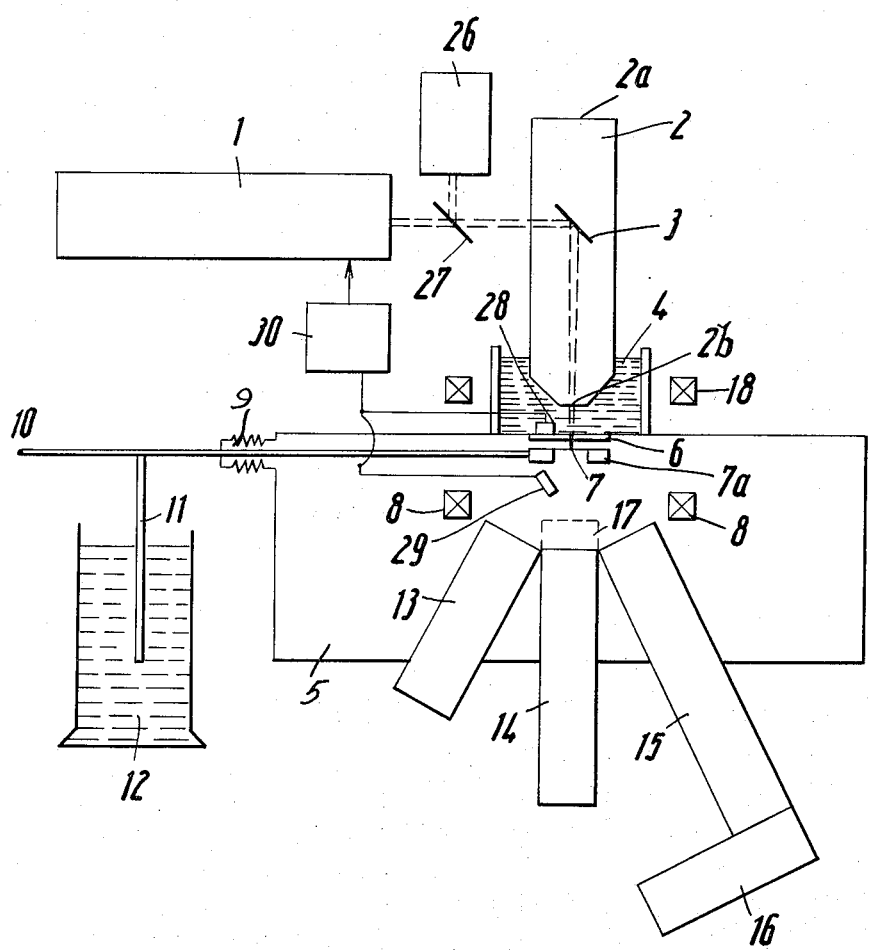
FIG. 1 shows a diagrammatic sketch of the apparatus according to the invention.

FIG. 1 shows a conventional, commercially available laser 1, consisting of a a power laser, an optic system, frequency doubler or non-linear optic element, diaphragms etc. Due to the frequency doubler, the wavelength of the laser beam can be place in the UV-range. The laser works in impulse operation, and the impulse width can be in the range of $\mu$-s or n-s, depending on the type of specimen material and on the desired excitation-or destruction effect. Very short impulses in the range of 20 n-s and below can be controlled by so-called Pockels cells.

The laser beam is introduced, for example, laterally into a microscope 2, and is guided by a mirror 3 to the objective 2b of the microscope. The objective 2b is arranged in a cooling liquid 4 which circulates through a cooling device (not shown) and is cooled there constantly to a low temperature of 77° K, for example by means of liquid nitrogen. The liquid 4 cooling the objective 2b acts at the same time due to its optic properties, as an immersion liquid to increase the numerical aperture of the microscope. Particularly suitable as a cooling-and immersion liquid is frigen 23.

The laser beam focused by the objective 2b arrives through a window 6 in a vacuum chamber 5 in which a high vacuum is constantly maintained by means not shown here. In the vacuum chamber 5 the specimen to be examined is arranged in a deep frozen specimen holder 7a. A connecting rod 10 to a specimen manipulator (not shown) for displacing the specimen holder 7a is led through a vacuum duct 9 out of the vacuum chamber 5 and has furthermore a connection 11 to a coolant 12. While the specimen 7 is cooled in the represented embodiment exclusively by the specimen holder 7a, the arrangement can also be such that the specimen 7 bears in direct contact on the vacuum window 6, so that the cooling also takes place directly through the cooling-and immersion liquid.

The laser beam is focused by the objective 2b on the specimen 7. Due to the laser beam, the charged and uncharged atoms and molecules are evaporated out of the specimen 7 or knocked out by direct emission. The charged particles are received by means of a mass spectrometer 15 with detector 16, for example a secondary electron multiplier, arranged underneath the specimen, and are analyzed with regard to their mass.

In order to homogenize the energy of the emitted charged particles and to ionize subsequently uncharged particles, if necessary, a device for producing a magnetic, electric and/or high-frequency field can be provided which is indicated by a coil 8 in the interior of the vacuum chamber 5. Additional field-generating device 18 outside the vacuum chamber 5 can can enhance the effect. Instead of this arrangement with a special device for generating a field, the apparatus can also be designed that the specimen 7 is arranged directly in the magnetic field of the mass spectrometer 15.

Other auxiliary and detecting means arranged underneath the specimen 7 are a monitor 13, consisting of a collector or secondary electron-multiplier for monitoring a uniform emission rate of the specimen, a lamp 14 for the microscopic observation of the specimen in the bright field, dark field, with phase contrast etc., as well as a device 17 (which has to be imagined arranged behind the lamp 14 pointed to the rear) to observe the luminescence. Furthermore a monitor (not shown) can be arranged in front of and/or behind the specimen to monitor the constancy of the laser radiation.

The means 13, 14, 15 and 17 can be mounted exchangeably on a revolving mount and be brought selectively into their operating position.

Figure 2:
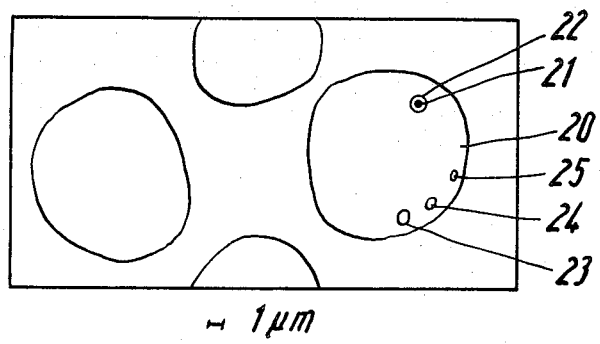
FIG. 2 shows schematically the operation of the method on a microbiological specimen.

In the operation of the apparatus we proceed as follows: The objective 2b is cooled by circulating cooling liquid 4. The specimen is prepared in a separate apparatus in the form of a deep frozen water-containing section by means of the cryotomy technique and by cooling it so rapidly that no crystal formation destroying the cell structures appears. The specimen is kept at the required low temperature by cooling the specimen holder 7a and, if necessary, by contact on the cooled vacuum window. By observation through the eyepiece 2a of the microscope 2, the area of the specimen to be examined is now placed under the objective 2b. Then the laser beam produced by the apparatus 1 is directed toward the desired point of the specimen, for example, in impulses of 20 n-s or less. FIG. 2 shows, for example, a portion of a specimen with red blood corpuscles 20 which have a diameter of about $8\mu$. The power density in the focus of the laser beam is distributed at about 96 percent to the central diffraction maximum 21, at about 3 percent to the diffraction maximum of the first order 22, and at less than 1 percent to the other diffraction rings, which can be disregarded.

The absorption of the laser radiation in the organic specimen material is extremely low with a low power density, that is, practically zero, and rises abruptly with increasing power density at first within a relatively narrow interval whose center can be in the range of about $10^7 - 10^9$ W/cm$^2$, depending on the specimen material and the wavelength. This range of the abrupt increase is so narrow that it is possible to select the power density higher in the central diffraction maximum and lower in the diffraction maximum of the first order. Absorption and destruction and evporation of the specimen material then only take place in the central diffraction maximum 21. This way it is possible to investigate regions 23, 24, 25 of the specimen material which are extremely narrow. The closer the power density in the central diffraction maximum 21 is above the jump limit, the smaller is the diameter of the craters formed, and in favorable cases it can be up to $0.1\mu$m and less.

Before a laser impulse is released, the desired point of the specimen must be focused in the focal spot of the optic system by displacing the specimen holder. This applies not only to the focusing in the x- and y coordinates in the specimen plane, but also the focusing in z-direction perpendicular thereto must also be very accurate because of the very low depth of focus (ab.$0.1\mu$m)

As an auxiliary means is used an auxiliary light source 26 which consists of a simple lamp, preferably of a continuously operated laser working with visible light (e.g. He-Ne laser). Parallel or parallel-directed light is deflected by a mirror 27 in the path of rays of the pulsating laser 1 and concides then with the latter, so that its focal spot produced by the microscope objective is at the same point and in the same focal plane as that of the laser 1. This focal spot is visible in the field of view of the microscope from the eyepiece 2a through the semipermeable mirror 3 and serves in the manner of cross wires as a mark for the adjustment to a desired point of the specimen. A criterion for the correct adjustment of a cell-structure in z-direction is substantially the clearly rising intensity of the reflected or scattered light, which occurs when a cell or cell structure is in the focal spot instead of transparent specimen fluid.

This effect can also be utilized for the automatic release of the laser impulses. To this end one or several photo-receivers are arranged above and/or under the specimen, for example, at the points designated by 28 and 29, that is, outside the direct path or rays, which are preferably selectively sensitive to the radiation of the auxiliary light source 26. Connected to the photo-receivers is a control device 30. When one of the micro-structures floating in the specimen fluid arrives in the focal spot of the auxiliary laser beam, and the scattered radiation received from the photo-receivers 28 and 29 thus rises beyond a threshold value to be set empirically, the control device 30 releases an impulse of the laser 1.

The auxiliary laser 26 can be used not only for aiming in operation, but also for pre-adjusting the device.

We claim:

1. In a method for analysis of micro or subcellulor regions of normally non-radiation absorptive biological material with optically focused coherent electromagnetic radiation the improvement comprising the step of setting the power density level of said radiation to a level at least equal to the level at which said material begins to absorb said radiation, and controlling the power density such that the said level is sufficient to initiate absorption only in the zero-th order diffraction ring or central diffraction disk with reference to the focus of the incident radiation.

2. The method specified in claim 1 wherein the power density in said central disk is at least to $10^7$ w/cm$^2$ and wherein the power density in the diffraction maximum of the first order ring is below $10^7$ w/cm$^2$.

3. The method specified in claim 1 wherein the power density in said central differentiation disk is at least equal to $10^9$ w/cm$^2$ and the power density in the diffraction maximum of the first order ring is below $10^9$ w/cm$^2$.

4. The method specified in claim 1 further comprising the step of producing said radiation in the UV-wavelength region.

5. The method specified in claim 4 wherein the step of producing UV-wavelengths comprises the step of exciting a ruby laser and doubling the normal frequency of said ruby laser.

6. The method specified in claim 4 wherein the step of producing UV-wavelengths comprises the step of exciting a ruby laser and non-linearly filtering the laser output to change the frequency to a UV-wavelength.

7. The method specified in claim 1 further comprising the step of subjecting removed specimen material to mass-spectroscopic analysis.

8. The method specified in claim 7 further comprising the step of subjecting removed specimen material to a force field for controlling the removed specimen material.

9. The method specified in claim 7 wherein said force field is an electromagnetic field.

10. The method specified in claim 9 wherein said electromagnetic field is generated by a mass-spectrometer and the said specimen is placed in said mass-spectrometer electromagnetic field.

11. Apparatus for the analysis of micro-regions of normally non-absorptive biological specimens comprising means for emitting coherent electromagnetic radiation in the UV-wavelength range, an optical system for focusing said radiation to microregion size and means for placing said specimen in the focal plane of said optical system, said emitting electromagnetic radiation having sufficient power density in the central diffraction disk to cause said specimen to absorb said radiation and to emit particles, said power density being below the level necessary to cause absorption in the first order diffraction ring and means for producing a force field adjacent said specimen to urge at least selected energy level emitted particles into said mass analyzing means.

12. Apparatus according to claim 11 wherein said means for emitting radiation in the UV-wavelength range comprises a laser.

13. Apparatus according to claim 11 wherein said force field is a magnetic field or an electric field or an HF field.

14. Apparatus according to claim 11 wherein said force field is formed by a mass-spectrometer and wherein said specimen is positioned in said force field.

15. Apparatus according to claim 14 comprising a second force field positioned outside said spectrometer for acting on said emitted particles.

16. Apparatus according to claim 11 wherein said optical system includes a microscope, said radiation being focused at least in part by said microscope.

17. Apparatus according to claim 11 further comprising means for deep freezing said specimen while said specimen is undergoing analysis.

18. Apparatus according to claim 11 further comprising means for ascertaining the effect of radiation on one or more optical properties of the specimen, said optical properties including absorption, scatter, fluorescence and phase shift of incident radiation.

19. Apparatus according to claim 16 further comprising a cooling between the microscope objective and the specimen for cooling the specimen.

20. Apparatus according to claim 19 further comprising means for circulating said cooling fluid to reduce temperature gradient in said specimen.

21. Apparatus according to claim 19 further comprising a window placed between said specimen and objective, one side of said window being in contact with said liquid and the other side of said window facing said specimen.

22. Apparatus according to claim 19 further comprising a vacuum chamber, said specimen being in said vacuum chamber.

23. Apparatus according to claim 22 wherein said objective is positioned in said vacuum chamber.

24. Apparatus according to claim 11 further comprising a source of visible radiation, said source of visible radiation being positioned to emit into said optical focusing system to produce a visible focal spot on the said specimen which coincides with the focal spot for the coherent electromagnetic radiation means for whereby the laser beam is pre-focused.

25. Apparatus according to claim 24 wherein said source of visible radiation is a continuously operable laser having low power density.

26. Apparatus according to claim 24 further comprising a plurality of photocells placed to receive visible radiation scattered by the specimen and switch means cnnected to the output of said photocells for operating said source of coherent electromagnetic radiation, said switch means operating said coherent source of electromagnetic radiation only after a selected level of visible radiation has been received by said photocells.

* * * * *